US008540222B2

(12) United States Patent
Westnedge et al.

(10) Patent No.: US 8,540,222 B2
(45) Date of Patent: Sep. 24, 2013

(54) AIR SPRING FOR A HEAVY-DUTY VEHICLE WITH DAMPING FEATURES

(75) Inventors: Andrew J. Westnedge, Bolingbrook, IL (US); Michael J. Keeler, Naperville, IL (US)

(73) Assignee: Hendrickson USA, L.L.C., Itasca, IL (US)

(*) Notice: Subject to any disclaimer, the term of this patent is extended or adjusted under 35 U.S.C. 154(b) by 171 days.

(21) Appl. No.: 13/228,908

(22) Filed: Sep. 9, 2011

(65) Prior Publication Data

US 2012/0061887 A1 Mar. 15, 2012

Related U.S. Application Data

(60) Provisional application No. 61/381,477, filed on Sep. 10, 2010.

(51) Int. Cl.
 *F16F 9/04* (2006.01)
(52) U.S. Cl.
 USPC ........................................ 267/64.27; 267/122
(58) Field of Classification Search
 USPC .......... 267/64.19, 64.21, 64.23, 64.24, 64.27, 267/122
 See application file for complete search history.

(56) References Cited

U.S. PATENT DOCUMENTS

| | | | |
|---|---|---|---|
| 1,516,004 A | 11/1924 | Eckrode et al. | |
| 2,694,569 A * | 11/1954 | Gouirand | 267/64.27 |
| 2,773,686 A * | 12/1956 | Nash | 267/64.27 |
| 2,827,283 A | 3/1958 | Browne et al. | |
| 2,979,326 A * | 4/1961 | Wilson, Jr. | 267/64.24 |
| 2,984,476 A * | 5/1961 | Turner | 267/35 |
| 3,190,635 A | 6/1965 | Wustenhagen et al. | |
| 3,395,931 A | 8/1968 | Piret | |
| 3,424,449 A | 1/1969 | Strifler | |
| 4,273,358 A | 6/1981 | Taft | |
| 4,407,491 A | 10/1983 | Kunihiro et al. | |
| 4,478,244 A | 10/1984 | Garrett | |
| 4,493,481 A | 1/1985 | Merkle | |
| 4,762,308 A | 8/1988 | Geno | |
| 4,844,428 A | 7/1989 | Margolis et al. | |
| 5,087,020 A | 2/1992 | Weber et al. | |

(Continued)

FOREIGN PATENT DOCUMENTS

| | | |
|---|---|---|
| DE | 4222922 A1 | 7/1992 |
| DE | 102009051944 * | 6/2010 |

(Continued)

OTHER PUBLICATIONS

Jack Gieck, P.E., Riding On Air, 1999, Society of Automotive Engineers, Inc., pp. 101-107,135.*

(Continued)

*Primary Examiner* — Thomas J Williams
(74) *Attorney, Agent, or Firm* — Dureska, Kennedy & Moore, LLC; David P. Dureska; Brent L. Moore

(57) ABSTRACT

An air spring for a heavy-duty vehicle axle/suspension system includes a bellows chamber operatively connected to a piston chamber. An opening is disposed between the bellows chamber and the piston chamber in order to allow fluid to communicate between the bellows chamber and the piston chamber. The cross-sectional area of the opening and the volumes of the bellows chamber and the piston chamber are tuned in order to optimize the damping characteristics of the air spring.

15 Claims, 6 Drawing Sheets

(56) References Cited

U.S. PATENT DOCUMENTS

| | | | |
|---|---|---|---|
| 5,234,203 A * | 8/1993 | Smith | 267/64.27 |
| 5,374,077 A | 12/1994 | Penzotti et al. | |
| 5,382,006 A | 1/1995 | Arnold | |
| 5,921,899 A | 7/1999 | Rose | |
| 5,954,316 A | 9/1999 | Voss | |
| 6,102,378 A * | 8/2000 | Gieseler et al. | 267/64.24 |
| 6,240,339 B1 | 5/2001 | von Mayenburg et al. | |
| 6,412,758 B1 | 7/2002 | Wenzel et al. | |
| 6,644,632 B1 | 11/2003 | Jaberg | |
| 7,140,601 B2 | 11/2006 | Nesbitt et al. | |
| 7,886,882 B2 | 2/2011 | Behmenburg et al. | |
| 2002/0074746 A1 | 6/2002 | Eberling et al. | |
| 2004/0032065 A1 * | 2/2004 | Leonard | 267/122 |
| 2006/0186586 A1 * | 8/2006 | Soles et al. | 267/64.27 |
| 2007/0290461 A1 * | 12/2007 | Oscarsson | 267/118 |
| 2011/0049774 A1 * | 3/2011 | Naber | 267/64.27 |
| 2011/0115140 A1 | 5/2011 | Moulik et al. | |

FOREIGN PATENT DOCUMENTS

| | | | |
|---|---|---|---|
| EP | 80561 A1 * | 6/1983 | |
| EP | 166702 A2 * | 1/1986 | |
| EP | 474171 A1 * | 3/1992 | |
| EP | 1571015 A3 | 5/2005 | |
| EP | 1647425 B1 | 8/2005 | |
| GB | 2333576 A * | 7/1999 | |
| JP | 04004332 A * | 1/1992 | |
| WO | WO 7900411 A1 * | 7/1979 | |

OTHER PUBLICATIONS

AIRIDE Desing Guide, 1992, Firestone Industrial Products Company.*

* cited by examiner

AIR SPRING FOR A HEAVY-DUTY VEHICLE WITH DAMPING FEATURES

CROSS-REFERENCE TO RELATED APPLICATION

This application claims the benefit of U.S. Provisional Patent Application Ser. No. 61/381,477, filed Sep. 10, 2010.

BACKGROUND OF THE INVENTION

1. Field of the Invention

The invention relates generally to the art of axle/suspension systems for heavy-duty vehicles. More particularly, the invention relates to air-ride axle/suspension systems for heavy-duty vehicles which utilize an air spring to cushion the ride of the vehicle. More specifically, the invention is directed to an air spring of a heavy-duty vehicle air-ride axle/suspension system, in which the air spring is optimized to provide damping characteristics to the air spring and in turn to the axle/suspension system based upon the volume of the bellows chamber of the air spring, the volume of the piston chamber of the air spring, and the size(s) of one or more openings formed in the air spring between and communicating with the bellows chamber and the piston chamber. Even more specifically, the flow of air between the piston chamber and the bellows chamber through the openings located between the piston chamber and the bellows chamber of the air spring provides viscous damping to the air spring.

2. Background Art

The use of air-ride trailing and leading arm rigid beam-type axle/suspension systems has been very popular in the heavy-duty truck and tractor-trailer industry for many years. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of primary frames, movable subframes and non-movable subframes.

Specifically, each suspension assembly of an axle/suspension system includes a longitudinally extending elongated beam. Each beam typically is located adjacent to and below a respective one of a pair of spaced-apart longitudinally extending main members and one or more cross members which form the frame of the vehicle. More specifically, each beam is pivotally connected at one of its ends to a hanger which in turn is attached to and depends from a respective one of the main members of the vehicle. An axle extends transversely between and typically is connected by some means to the beams of the pair of suspension assemblies at a selected location from about the mid-point of each beam to the end of the beam opposite from its pivotal connection end. The beam end opposite the pivotal connection end also is connected to an air spring, or its equivalent, which in turn is connected to a respective one of the main members. A height control valve is mounted on the main member or other support structure and is operatively connected to the beam and to the air spring in order to maintain the ride height of the vehicle. A brake system and one or more shock absorbers for providing damping to the axle/suspension system of the vehicle also are mounted on the axle/suspension system. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle.

The axle/suspension systems of the heavy-duty vehicle act to cushion the ride, dampen vibrations and stabilize the vehicle. More particularly, as the vehicle is traveling over the road, its wheels encounter road conditions that impart various forces, loads, and/or stresses, collectively referred to herein as forces, to the respective axle on which the wheels are mounted, and in turn, to the suspension assemblies that are connected to and support the axle. In order to minimize the detrimental effect of these forces on the vehicle as it is operating, the axle/suspension system is designed to react and/or absorb at least some of them.

These forces include vertical forces caused by vertical movement of the wheels as they encounter certain road conditions, fore-aft forces caused by acceleration and deceleration of the vehicle, and side-load and torsional forces associated with transverse vehicle movement, such as turning of the vehicle and lane-change maneuvers. In order to address such disparate forces, axle/suspension systems have differing structural requirements. More particularly, it is desirable for an axle/suspension system to be fairly stiff in order to minimize the amount of sway experienced by the vehicle and thus provide what is known in the art as roll stability. However, it is also desirable for an axle/suspension system to be relatively flexible to assist in cushioning the vehicle from vertical impacts, and to provide compliance so that the components of the axle/suspension system resist failure, thereby increasing durability of the axle/suspension system. It is also desirable to dampen the vibrations or oscillations that result from such forces. A key component of the axle/suspension system that cushions the ride of the vehicle from vertical impacts is the air spring, while a shock absorber typically provides damping characteristics to the axle/suspension system.

The typical air spring of the type utilized in heavy-duty air-ride axle/suspension systems includes three main components, a flexible bellows, a piston and a bellows top plate. The bellows is typically formed from rubber or other flexible material, and is operatively mounted on top of the piston. The piston is typically formed from steel, aluminum, fiber reinforced plastics or other rigid material and is mounted on the rear end of the top plate of the beam of the suspension assembly, by fasteners, which are generally well known in the art. The volume of pressurized air, or "air volume", that is contained within the air spring is a major factor in determining the spring rate of the air spring. More specifically, this air volume is contained within the bellows and, in some cases, the piston of the air spring. The larger the air volume of the air spring, the lower the spring rate of the air spring. A lower spring rate is generally more desirable in the heavy-duty vehicle industry because it provides a softer ride to the vehicle during operation. Typically, the piston either contains a hollow cavity, which is in communication with the bellows and which adds to the air volume of the air spring by allowing unrestricted communication of air between the piston and the bellows volumes, or the piston has a generally hollow cylindrical-shape and does not communicate with the bellows volume, whereby the piston does not contribute to the air volume of the air spring. The air volume of the air spring is in fluid communication with an air source, such as an air supply tank, and also is in fluid communication with the height control valve of the vehicle. The height control valve, by directing air flow into and out of the air spring of the axle/suspension system, helps maintain the desired ride height of the vehicle.

Prior art air springs such as the one described above, while providing cushioning to the vehicle cargo and occupant(s) during operation of the vehicle, provide little if any damping characteristics to the axle/suspension system. Such damping characteristics are instead typically provided by a pair of hydraulic shock absorbers, although a single shock absorber has also been utilized and is generally well known in the art. Each one of the shock absorbers is mounted on and extends between the beam of a respective one of the suspension assemblies of the axle/suspension system and a respective one of the main members of the vehicle. These shock absorbers add complexity and weight to the axle/suspension system. Moreover, because the shock absorbers are a service item of the axle/suspension system that will require maintenance and/or replacement from time to time, they also add additional maintenance and/or replacement costs to the axle/suspension system.

The amount of cargo that a vehicle may carry is governed by local, state, and/or national road and bridge laws. The basic principle behind most road and bridge laws is to limit the maximum load that a vehicle may carry, as well as to limit the maximum load that can be supported by individual axles. Because shock absorbers are relatively heavy, these components add undesirable weight to the axle/suspension system and therefore reduce the amount of cargo that can be carried by the heavy-duty vehicle. Depending on the shock absorbers employed, they also add varying degrees of complexity to the axle/suspension system which is also undesirable.

Certain prior art air springs have attempted to provide damping characteristics to the air spring by placing valves between the bellows and piston chambers of the air spring. Still other prior art air springs have attempted to provide damping characteristics to the air spring by forming an opening between the bellows and piston chambers of the air spring which is partially covered by rubber flaps mounted adjacent to the opening in order to provide damping characteristics to the air spring. Still other prior art air springs have included a large opening or openings between the bellows and the piston in order to allow full, unrestricted, communication of air between the two volumes to increase the air volume and hence reduce the spring rate of the air spring which provides a softer ride to the vehicle during operation. However, the prior art air springs that include valves are complicated and require valve components that can break down over time requiring expense and time to replace. Prior art air springs that have included openings with rubber flaps typically restrict some air movement in one direction but allow free air flow in the opposite direction. Moreover, these rubber flaps, like the valves, are additional components within the air spring that can wear, requiring costly repairs and/or maintenance. In addition, these prior art air springs, which include openings between the bellows and the piston, do not consider the volume of the bellows chamber, the volume of the piston chamber or the size and/or number of openings formed between and communicating with the bellows chamber and the piston chamber in order to provide improved damping characteristics to the air spring.

The air spring with damping features for heavy-duty vehicles of the present invention, overcomes the problems associated with prior art air springs by providing certain structural relationships between the bellows chamber, piston chamber and openings formed between and communicating with the bellows and piston chambers, resulting in optimization of the damping characteristics of the air spring, while using generally fewer parts than prior art air springs that utilize valves, rubber flaps and the like. The air spring with damping features for heavy-duty vehicles includes tuning certain structural components of the air spring in order to optimize or find the "sweet spot" for the damping characteristics of the air spring for a given application, based upon piston chamber volume, bellows chamber volume and the size, shape, length, and/or number of openings formed between and communicating with the bellows chamber and the piston chamber of the air spring. By providing an air spring for heavy-duty vehicles having optimized damping characteristics, the shock absorber of the axle/suspension system can be eliminated or its size reduced, reducing complexity, saving weight and cost, and allowing the heavy-duty vehicle to haul more cargo. Moreover, elimination of the shock absorbers, valves and/or rubber flaps potentially eliminates costly repairs and/or maintenance costs associated with these more complicated systems.

SUMMARY OF THE INVENTION

Objectives of the present invention include providing an air spring having optimized damping characteristics.

A further objective of the present invention is to eliminate or reduce the size of the shock absorber, thereby reducing complexity, saving weight and cost, and allowing the heavy-duty vehicle to haul more cargo.

Yet another objective of the present invention is to provide an air spring having optimized damping characteristics that is relatively simple and which eliminates or reduces costly repairs and/or maintenance costs.

These objectives and advantages are obtained by the air spring of the present invention which includes a bellows chamber operatively connected to a piston chamber. At least one opening is disposed between the bellows chamber and the piston chamber. The at least one opening allows fluid to communicate between the bellows chamber and the piston chamber, whereby a ratio of a cross-sectional area of the at least one opening in inches squared to a volume of the piston chamber in inches cubed to a volume of the bellows chamber in inches cubed, is from about 1:600:1200 to about 1:14100:23500.

BRIEF DESCRIPTION OF THE SEVERAL VIEWS OF THE DRAWINGS

The preferred embodiments of the present invention, illustrative of the best mode in which applicants have contemplated applying the principles, are set forth in the following description and are shown in the drawings, and are particularly and distinctly pointed out and set forth in the appended claims.

Similar numerals refer to similar parts throughout the drawings.

DESCRIPTION OF THE PREFERRED EMBODIMENT

Figure 1:
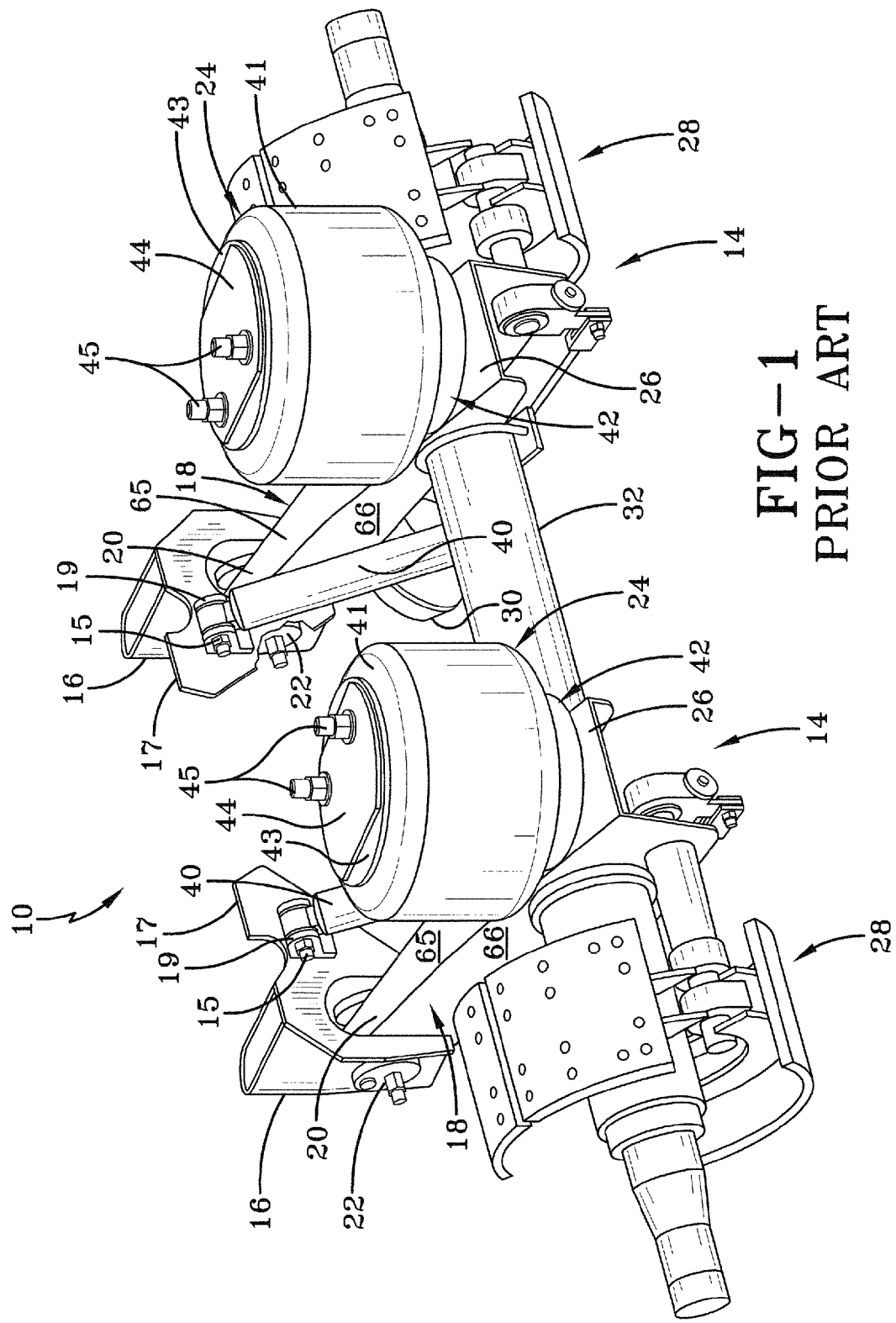
FIG. 1 is a top rear perspective view of an axle/suspension system incorporating a pair of prior art air springs, and showing a pair of shock absorbers, with each one of the pair of shock absorbers mounted on a respective one of the suspension assemblies of the axle/suspension system.

In order to better understand the environment in which the air spring with damping features for a heavy-duty vehicle of the present invention is utilized, a trailing arm overslung beam-type air-ride axle/suspension system that incorporates a prior art air spring 24, is indicated generally at 10, is shown in FIG. 1, and now will be described in detail below.

It should be noted that axle/suspension system 10 is typically mounted on a pair of longitudinally-extending spaced-apart main members (not shown) of a heavy-duty vehicle, which is generally representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. Because axle/suspension system 10 generally includes an identical pair of suspension assemblies 14, for sake of clarity only one of the suspension assemblies will be described below.

Suspension assembly 14 is pivotally connected to a hanger 16 via a trailing arm overslung beam 18. More specifically, beam 18 is formed having a generally upside-down integrally formed U-shape with a pair of sidewalls 66 and a top plate 65, with the open portion of the beam facing generally downwardly. A bottom plate 63 extends between and is attached to the lowermost ends of sidewalls 66 by any suitable means such as welding to complete the structure of beam 18. Trailing aim overslung beam 18 includes a front end 20 having a bushing assembly 22, which includes a bushing, pivot bolts and washers as are well known in the art, to facilitate pivotal connection of the beam to hanger 16. Beam 18 also includes a rear end 26, which is welded or otherwise rigidly attached to a transversely-extending axle 32.

Suspension assembly 14 also includes air spring 24, mounted on and extending between beam rear end 26 and the main member (not shown). Air spring 24 includes a bellows 41 and a piston 42. The top portion of bellows 41 is sealingly engaged with a bellows top plate 43. An air spring mounting plate 44 is mounted on top plate 43 by fasteners 45, which are also used to mount the top portion of air spring 24 to the vehicle main member (not shown). Piston 42 is generally cylindrically shaped and has a generally flat bottom plate and top plate (not shown). The bottom portion of bellows 41 is sealingly engaged with piston top plate (not shown). The piston bottom plate rests on beam top plate 65 at beam rear end 26 and is attached thereto in a manner well known to those having skill in the art, such as by fasteners or bolts (not shown). The piston top plate is formed without openings so that there is no fluid communication between piston 42 and bellows 41. As a result, piston 42 does not generally contribute any appreciable volume to air spring 24. The top end of a shock absorber 40 is mounted on an inboardly extending wing 17 of hanger 16 via a mounting bracket 19 and a fastener 15, in a manner well known in the art. The bottom end of shock absorber 40 is mounted to beam 18 (the mount not shown) in a manner well known to those having skill in the art. For the sake of relative completeness, a brake system 28 including a brake chamber 30 is shown mounted on prior art suspension assembly 14.

As mentioned above, axle/suspension system 10 is designed to absorb forces that act on the vehicle as it is operating. More particularly, it is desirable for axle/suspension system 10 to be rigid or stiff in order to resist roll forces and thus provide roll stability for the vehicle. This is typically accomplished by using beam 18, which is rigid, and also is rigidly attached to axle 32. It is also desirable, however, for axle/suspension system 10 to be flexible to assist in cushioning the vehicle (not shown) from vertical impacts and to provide compliance so that the axle/suspension system resists failure. Such flexibility typically is achieved through the pivotal connection of beam 18 to hanger 16 with bushing assembly 22. Air spring 24 and shock absorber 40 also assist in cushioning the ride for cargo and passengers.

Prior art air spring 24 described above, has very limited or no damping capabilities because its structure, as described above, does not provide for the same. Instead, prior art air spring 24 relies on shock absorber 40 to provide damping to axle/suspension system 10. Because shock absorber 40 is relatively heavy, this adds weight to axle/suspension system 10 and therefore reduces the amount of cargo that can be carried by the heavy-duty vehicle. Shock absorbers 40 also add complexity to axle/suspension system 10. Moreover, because shock absorbers 40 are a service item of axle/suspension system 10 that will require maintenance and/or replacement from time to time, they also add additional maintenance and/or replacement costs to the axle/suspension system. The air spring with damping features for heavy-duty vehicles of the present invention overcomes the problems associated with prior art air springs, including those having openings, valves, flaps and the like, as well as the typical prior art air spring lacking such additional components described above, and will now be described in detail below.

Figure 2:
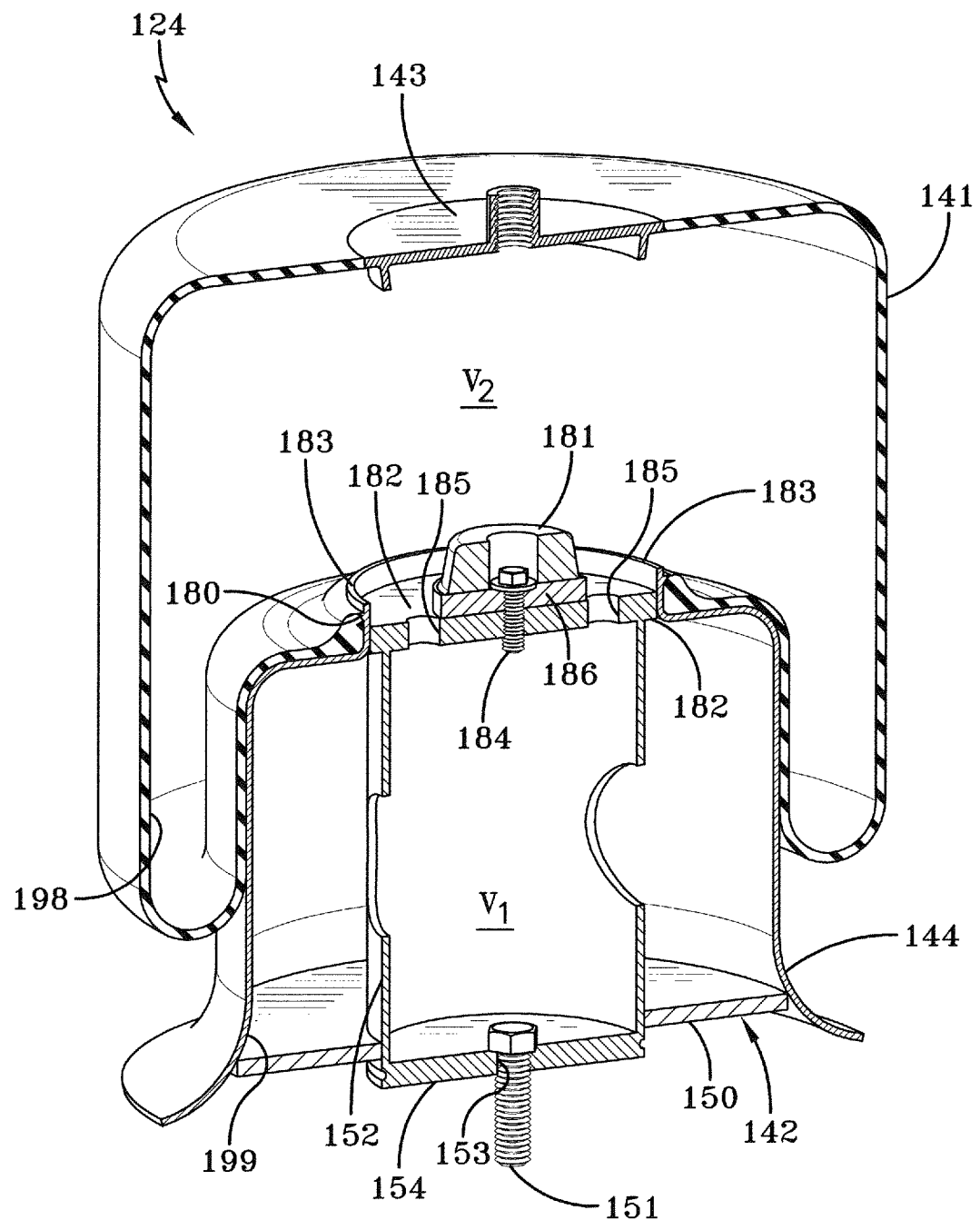
FIG. 2 is a perspective view of a first preferred embodiment air spring of the present invention in section, showing the openings formed in the piston top plate between and communicating with the piston chamber and the bellows chamber, and also showing a bumper attached to the top plate of the piston.

A first preferred embodiment air spring of the present invention is shown generally at 124 in FIG. 2, is used in conjunction with an axle of an axle/suspension system having a gross axle weight rating (GAWR) of about 20,000 lbs., and will be described in detail below. It should be understood that the description below is by way of example and not by way of limitation and preferred embodiment air spring 124 of the present invention could be scaled up or down according to the GAWR of the axle of the axle/suspension system on which it is being utilized without changing the overall concept or operation of the present invention. Like prior art air spring 24, air spring 124 of the present invention is incorporated into axle/suspension system 10, or other similar air-ride axle/suspension system. Air spring 124 includes a bellows 141 and a piston 142. The top end of bellows 141 is sealingly engaged with a bellows top plate 143 in a manner well known in the art. An air spring mounting plate (not shown) is mounted on the top surface of top plate 143 by fasteners (not shown) which are also used to mount the top portion of air spring 124 to a respective one of the main members (not shown) of the vehicle. Alternatively, bellows top plate 143 could also be mounted directly on a respective one of the main members (not shown) of the vehicle. Piston 142 is generally cylindrical-shaped and includes a continuous generally stepped sidewall 144 attached to a generally flat bottom plate 150 and integrally formed with a top plate 182. Bottom plate 150 is formed with an upwardly-extending central hub 152. Central hub 152 includes a bottom plate 154 formed with a central opening 153. A fastener 151 is disposed through opening 153 in order to attach piston 142 to beam top plate 65 at beam rear end 26 (FIG. 1).

Top plate 182, sidewall 144 and bottom plate 150 of piston 142 define a piston chamber 199 having an interior volume $V_1$. Top plate 182 of piston 142 is formed with a circular upwardly-extending protrusion 183 having a lip 180 around its circumference. Lip 180 cooperates with the lowermost end of bellows 141 to form an air tight seal between the bellows and the lip, as is well known to those of ordinary skill in the art. Bellows 141, top plate 143 and piston top plate 182 define a bellows chamber 198 having an interior volume $V_2$ at standard static ride height. A bumper 181 is rigidly attached to a bumper mounting plate 186 by means generally well known in the art. Bumper mounting plate 186 is in turn mounted on piston top plate 182 by a fastener 184. Bumper 181 extends upwardly from the top surface of bumper mounting plate 186. Bumper 181 serves as a cushion between piston top plate 182 and bellows top plate 143 in order to keep the plates from contacting one another during operation of the vehicle, which can potentially cause damage to the plates.

In accordance with one of the primary features of the present invention, piston top plate 182 is formed with a pair of openings 185, which allow volume $V_1$ of piston chamber 199 and volume $V_2$ of bellows chamber 198 to communicate with one another. More particularly, openings 185 allow fluid or air to pass between piston chamber 199 and bellows chamber 198 during operation of the vehicle. Openings 185 are circular shaped, but other shapes, sizes, lengths, and numbers of openings could be utilized without changing the overall concept or operation of the present invention.

It is contemplated that the ratio of the cross-sectional area of openings 185 measured in in.$^2$ to the volume of piston chamber 199 measured in in.$^3$ to the volume of bellows chamber 198 measured in in.$^3$ is in the range of ratios of from about 1:600:1200 to about 1:14100:23500.

By way of example, air spring 124 for axle/suspension system 10 for a heavy-duty trailer having an axle GAWR of about 20,000 lbs., utilizes bellows chamber 198 having volume $V_2$ equal to about 485 in.$^3$, piston chamber 199 having volume $V_1$ of about 240 in.$^3$, and openings 185 having a combined cross-sectional area of about 0.06 in.$^2$. As set forth above, air spring 124 of the present invention, including the ranges of ratios set forth above, could be scaled upwardly or downwardly according to the GAWR of axle 32 of axle/suspension system 10 on which it is being utilized without changing the overall concept or operation of the present invention.

Having now described the structure of first embodiment air spring 124 of the present invention, the operation of the damping characteristics of the air spring will be described in detail below. When axle 32 of axle/suspension system 10 experiences a jounce event, such as when the vehicle wheels encounter a curb or a raised bump in the road, the axle moves vertically upwardly toward the vehicle chassis. In such a jounce event, bellows chamber 198 is compressed by axle/suspension system 10 as the wheels of the vehicle travel over the curb or the raised bump in the road. The compression of air spring bellows chamber 198 causes the internal pressure of the bellows chamber to increase. Therefore, a pressure differential is created between bellows chamber 198 and piston chamber 199. This pressure differential causes air to flow from bellows chamber 198, through piston top plate openings 185 and into piston chamber 199. The restricted flow of air between bellows chamber 198 into piston chamber 199 through piston top plate openings 185 causes viscous damping to occur. As an additional result of the air flow through openings 185, the pressure differential between bellows chamber 198 and piston chamber 199 is reduced. Air continues to flow through piston top plate openings 185 until the pressures of piston chamber 199 and bellows chamber 198 have equalized.

Conversely, when axle 32 of axle/suspension system 10 experiences a rebound event, such as when the vehicle wheels encounter a large hole or depression in the road, the axle moves vertically downwardly away from the vehicle chassis. In such a rebound event, bellows chamber 198 is expanded by axle/suspension system 10 as the wheels of the vehicle travel into the hole or depression in the road. The expansion of air spring bellows chamber 198 causes the internal pressure of the bellows chamber to decrease. As a result, a pressure differential is created between bellows chamber 198 and piston chamber 199. This pressure differential causes air to flow from piston chamber 199, through piston top plate openings 185, and into bellows chamber 198. The restricted flow of air through piston top plate openings 185 causes viscous damping to occur. As an additional result of the air flow through openings 185, the pressure differential between bellows chamber 198 and piston chamber 199 is reduced. Air will continue to flow through the piston top plate openings 185 until the pressures of piston chamber 199 and bellows chamber 198 have equalized. When little or no suspension movement has occurred over a period of several seconds the pressure of bellows chamber 198 and piston chamber 199 can be considered equal.

Figure 6:
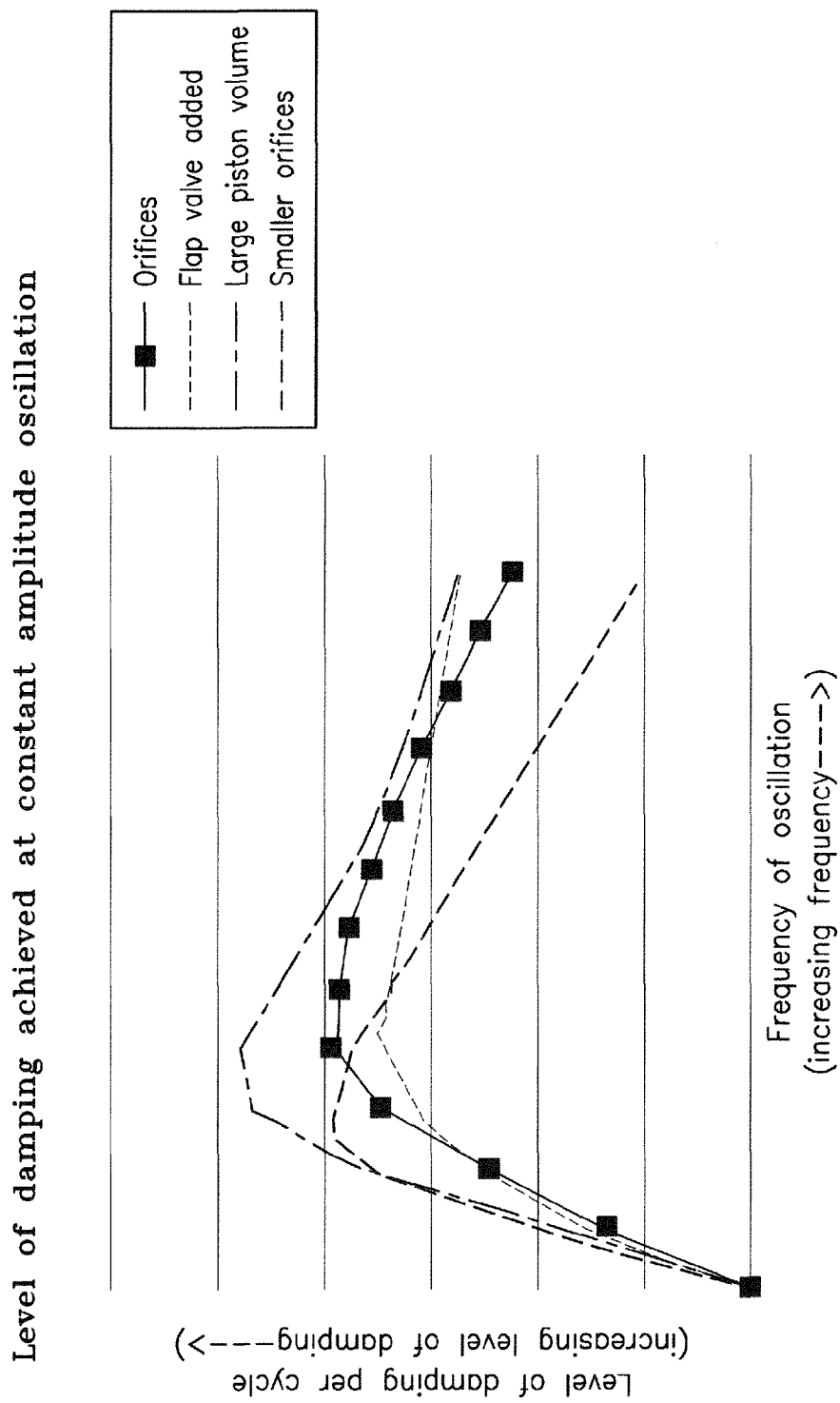
FIG. 6 is a graph generally illustrating the relative levels of damping that can be achieved by different variants of the air spring of the present invention when the air spring is tested at a constant amplitude cycle over a range of frequencies.

With additional reference to FIG. 6, by adjusting the relative sizes of volume $V_1$ of piston chamber 199, volume $V_2$ of bellows chamber 198, and/or piston top plate openings 185, it is possible to tune the level of viscous damping that is achieved as well as the frequency at which the highest level of viscous damping occurs. The level of damping achieved is measured by the energy that is lost through viscous damping over one cycle or oscillation. For example, a relatively smaller bellows chamber volume $V_2$, will generally produce a higher level of damping, as the pressure change within bellows chamber 198 will be higher for a given event, i.e., a higher pressure differential means more flow through piston top plate openings 185, thereby resulting in more viscous damping. By further example, a relatively larger piston chamber volume $V_1$, will also generally produce a higher level of damping (FIG. 6), as the pressure differential between piston chamber 199 and bellows chamber 198 will generally take longer to equalize, i.e., more air will need to flow through piston top plate openings 185 resulting in more viscous damping between the piston chamber and the bellows chamber. By further example, changing the relative cross-sectional size, shape, number or even the length of piston top plate openings 185 will in turn affect the time it takes for the pressures in piston chamber 199 and bellows chamber 198 to equalize. Therefore, the cross-sectional size of piston top plate opening 185 can be altered to both vary the level of viscous damping and the frequency at which the highest level of damping occurs, as shown generally in FIG. 6.

As described above, volume $V_1$ of piston chamber 199, volume $V_2$ of bellows chamber 198, along with the cross-sectional area of openings 185, all in relation to one another, provide application-specific damping characteristics, at standard temperature and pressure, to air spring 124 during operation of the vehicle. More specifically, the structural size of piston chamber 199 and bellows chamber 198 can be modified in order to increase or decrease volumes $V_1$ and $V_2$ of the piston chamber and the bellows chamber, respectively, in order to tune the damping characteristics of air spring 124 for certain applications. More particularly, as volume $V_1$ of piston chamber 199 increases, the damping capabilities of air spring 124 are also generally increased. As volume $V_2$ of bellows chamber 198 decreases, the damping capabilities of air spring 124 are generally increased. Moreover, the relative size of openings 185 determines the frequency at which improved damping will occur, with increased opening sizes raising the frequency at which the highest level of damping occurs and with decreased opening sizes lowering the frequency at which the highest level of damping occurs, as shown generally in FIG. 6.

Figure 3:
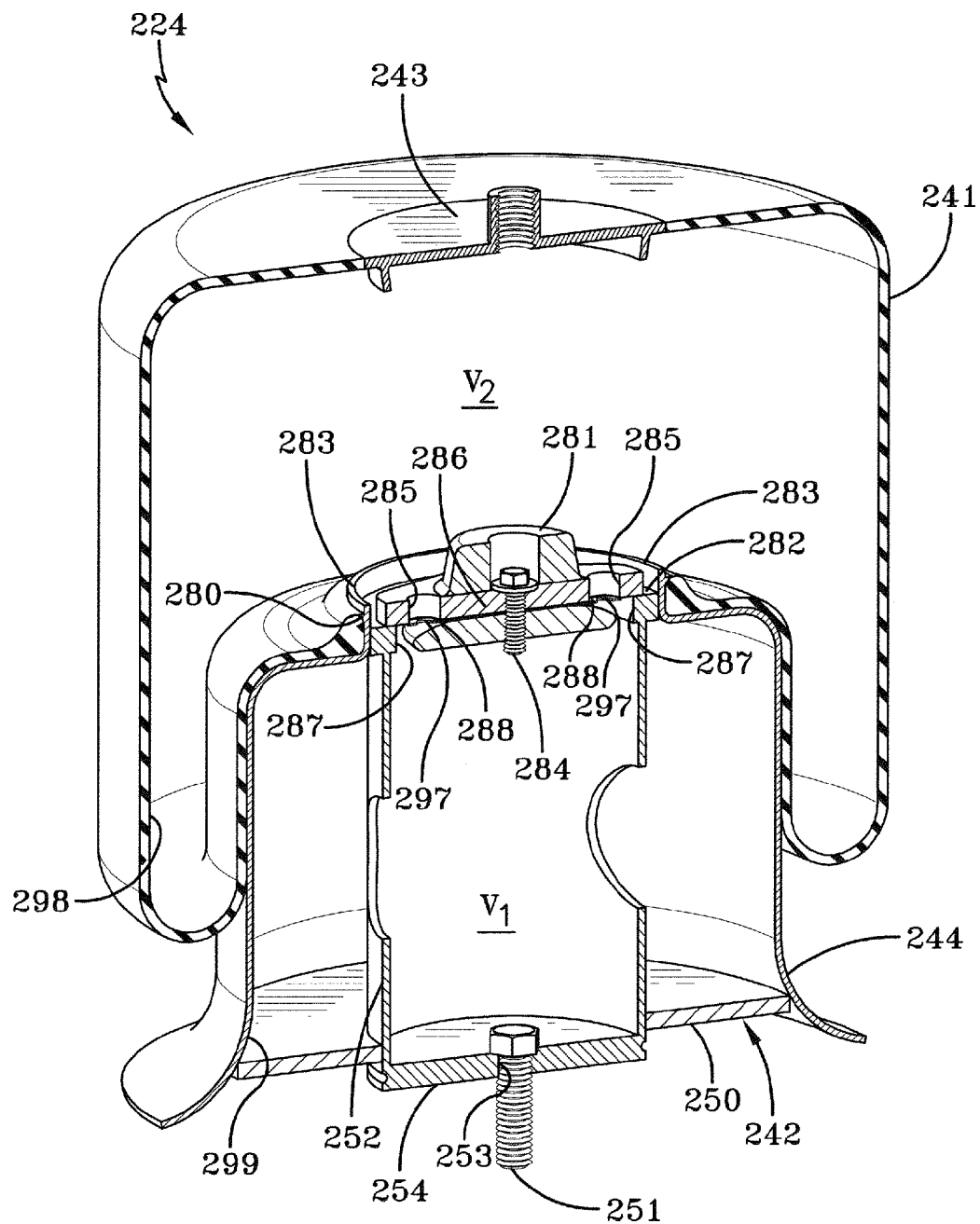
FIG. 3 is a perspective view of a second preferred embodiment air spring of the present invention in section, showing the openings formed in the bumper mounting plate and the piston top plate between and communicating with the piston chamber and the bellows chamber, along with adjacent flappers, and also showing the bumper attached to the top surface of the top plate of the piston.

A second preferred embodiment air spring of the present invention is shown generally at 224 in FIG. 3, and now will be described in detail below. Like prior art air spring 24, air spring 224 of the present invention is incorporated into axle/suspension system 10, or other similar air-ride axle/suspension system. Air spring 224 includes a bellows 241 and a piston 242. The top end of bellows 241 is sealingly engaged with a bellows top plate 243 in a manner well known in the art. An air spring mounting plate (not shown) is mounted on the top surface of top plate 243 by fasteners (not shown) which are also used to mount the top portion of air spring 224 to a respective one of the main members (not shown) of the vehicle. Piston 242 is generally cylindrical-shaped and includes a continuous generally stepped sidewall 244 attached to a generally flat bottom plate 250 and integrally formed with a top plate 282. Bottom plate 250 is formed with an upwardly-extending central hub 252. Central hub 252 includes a bottom plate 254 formed with a central opening 253. A fastener 251 is disposed through opening 253 in order to attach piston 242 to beam top plate 65 at beam rear end 26 (FIG. 1).

Top plate 282, sidewall 244 and bottom plate 250 of piston 242 define a piston chamber 299 having an interior volume $V_1$. Top plate 282 of piston 242 is formed with a circular upwardly-extending protrusion 283 having a lip 280 around its circumference. Lip 280 cooperates with the lowermost end of bellows 241 to form an air tight seal between the bellows and the lip, as is well known to those of ordinary skill in the art. Bellows 241, top plate 243 and piston top plate 282 define a bellows chamber 298 having an interior volume $V_2$ at standard static ride height. A bumper 281 is mounted on a bumper mounting plate 286 by adhesive or other similar mounting means. Bumper mounting plate 286 is mounted on piston top plate 282 by a fastener 284. Bumper 281 extends upwardly from the top surface of bumper mounting plate 286. Bumper 281 serves as a cushion between piston top plate 282 and bellows top plate 243 in order to keep the plates from contacting one another during operation of the vehicle, which can potentially cause damage to the plates.

Figure 4:
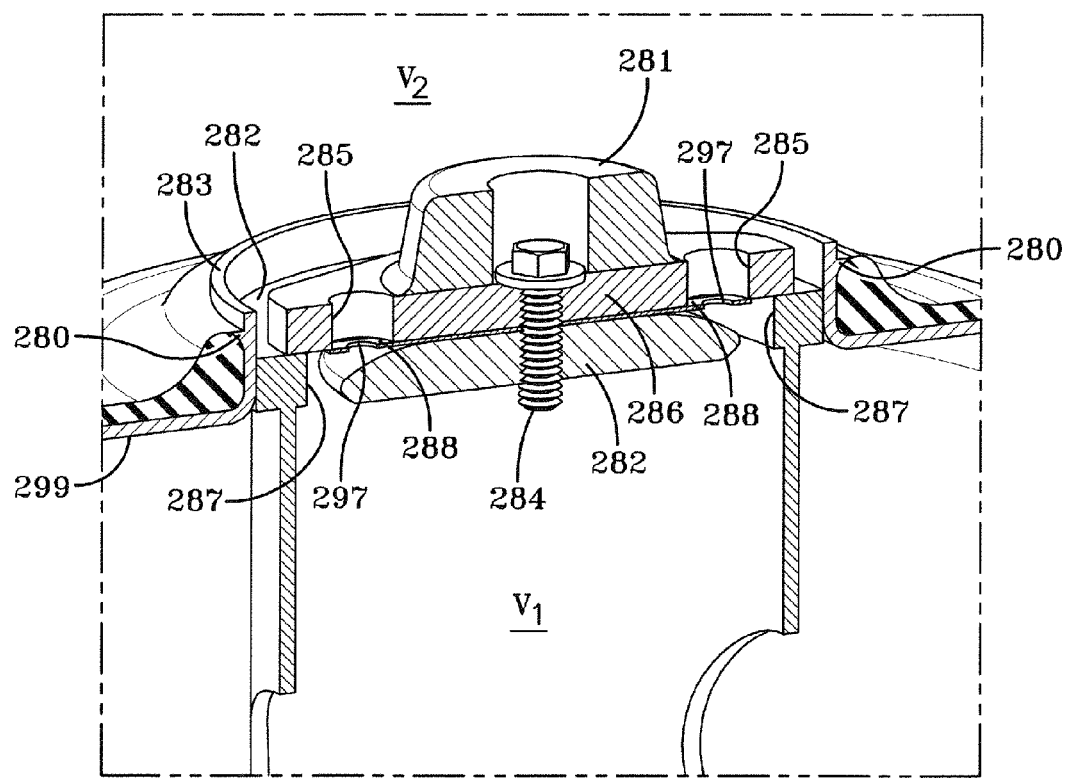
FIG. 4 is a greatly enlarged fragmentary perspective view of the second preferred embodiment air spring of the present invention in section, showing the flappers disposed between the piston top plate and the bumper mounting plate, and showing the flappers urged upwardly against the bumper mounting plate when air is flowing from the piston chamber into the bellows chamber.
Figure 5:
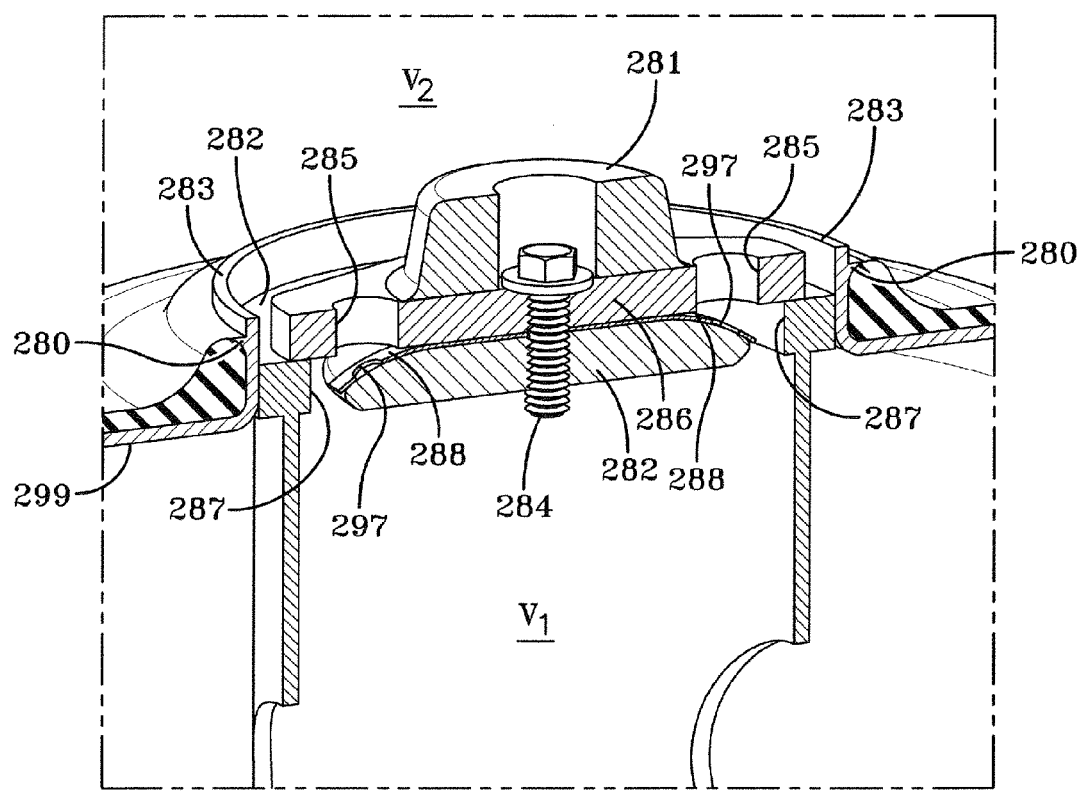
FIG. 5 is a view similar to FIG. 4, but showing the flappers urged downwardly against the piston top plate when air is flowing from the bellows chamber into the piston chamber.

In accordance with one of the primary features of the present invention, bumper mounting plate 286 is formed with a pair of openings 285 which communicate with a pair of openings 287 formed in piston top plate 282. A flapper 288 formed from metal is disposed between bumper mounting plate 286 and piston top plate 282. Flapper 288 also is formed with an orifice 297. Flapper 288 allows air to flow relatively freely from bellows chamber 298 into piston chamber 299, but restricts air flow from the piston chamber into the bellows chamber through flapper orifice 297. Flapper 288 serves to modify air flow between piston chamber 299 and bellows chamber 298 depending upon the direction of the air flow, either into the piston chamber or out of the piston chamber. For example, air flow from piston chamber 299 into bellows chamber 298 is restricted by flapper orifice 297. More specifically, when air flows from piston chamber 299 into bellows chamber 298, flapper 288 is urged upwardly against bumper mounting plate 286 and bumper mounting plate opening 285 (FIG. 4). Because flapper orifice 297 is generally smaller than bumper mounting plate opening 285 and piston top plate opening 287, air flow is restricted by the flapper orifice. By further example, air flow in the opposite direction from bellows chamber 298 into piston chamber 299 is restricted by bumper mounting plate opening 285. More specifically, when air flows from bellows chamber 298 into piston chamber 299, flapper 288 is urged downwardly and rests on piston top plate 282 (FIG. 5). This effectively opens communication between bumper mounting plate opening 285 and piston top plate opening 287. Because bumper mounting plate opening 285 is generally smaller than piston top plate opening 287, air flow is restricted by the bumper mounting plate opening. Flapper 288 generally is capable of increasing the relative level of damping of the air spring at higher frequencies when compared to an air spring without flappers (FIG. 6). Bumper mounting plate openings 285 are circular shaped, but other shapes, sizes, lengths and numbers of openings could be utilized without changing the overall concept or operation of the present invention. It is contemplated that flappers 288 could be formed from different materials having other shapes and sizes without changing the overall concept or operation of the present invention. Flapper orifices 297 are circular shaped, but other shapes, sizes, lengths and numbers of openings could be utilized without changing the overall concept or operation of the present invention. It is contemplated that bumper mounting plate openings 285 should be at least as large as flapper orifices 297.

It is further contemplated that the ratio of the cross-sectional areas of flapper orifices 297 measured in in.$^2$ to the volume of piston chamber 299 measured in in.$^3$ to the volume of bellows chamber 298 measured in in.$^3$ is in the range of ratios of from about 1:600:1200 to about 1:14100:23500.

By way of example, air spring 224 for axle/suspension system 10 for a heavy-duty trailer having an axle GAWR of about 20,000 lbs., utilizes bellows chamber 298 having volume $V_2$ equal to about 485 in.$^3$, piston chamber 299 having volume $V_1$ of about 240 in.$^3$, openings 285 having a combined cross-sectional area of about 0.3 in.$^2$, and flapper orifices 297 having a combined cross-sectional area of about 0.06 in.$^2$. As set forth above, air spring 224 of the present invention, including the ranges of ratios set forth above, could be scaled upwardly or downwardly according to the GAWR of axle 32 of axle/suspension system 10 on which it is being utilized without changing the overall concept or operation of the present invention.

Having now described the structure of second embodiment air spring 224 of the present invention, the operation of the air spring will be described in detail below. When axle 32 of axle/suspension system 10 experiences a jounce event, such as when the vehicle wheels encounter a curb or a raised bump in the road, the axle moves vertically upwardly toward the vehicle chassis. In such a jounce event, bellows chamber 298 is compressed by axle/suspension system 10 as the wheels of the vehicle travel over the curb or the raised bump in the road. The compression of air spring bellows chamber 298 causes the internal pressure of the bellows chamber to increase. Therefore, a pressure differential is created between bellows chamber 298 and piston chamber 299. This pressure differential causes air to flow from bellows chamber 298, through bumper mounting plate openings 285, causing flappers 288 to be forced downwardly as described in detail above and shown in FIG. 5, allowing air to flow into piston chamber 299 through top plate openings 287. By changing the characteristics, for example the stiffness, shape, size, length and number of flappers 288 and or flapper orifices 297 and the shape, size, number, length of bumper mounting plate openings 285, it is possible to alter the restriction of the air flow caused by the flapper and bumper mounting plate opening combination. The restricted flow of air from bellows chamber 298 into piston chamber 299 through bumper mounting plate openings 285 and over flappers 288 causes viscous damping to occur. As an additional result of the flow through bumper mounting plate openings 285 and over flappers 288, the pressure differential between bellows chamber 298 and piston chamber 299 is reduced. Air will continue to flow through bumper mounting plate openings 285, over flappers 288 into piston chamber 299 until the pressures of the piston chamber and bellows chamber 298 have equalized.

Conversely, when axle 32 of axle/suspension system 10 experiences a rebound event, such as when the vehicle wheels encounter a large hole or depression in the road, the axle moves vertically downwardly away from the vehicle chassis. In such a rebound event, bellows chamber 298 is expanded by axle/suspension system 10 as the wheels of the vehicle travel into the hole or depression in the road. The expansion of air spring bellows chamber 298 causes the internal pressure of the bellows chamber to decrease. As a result, a pressure differential is created between bellows chamber 298 and piston chamber 299. This pressure differential causes air to flow from piston chamber 299, through flapper orifices 297, through bumper mounting plate openings 285, through top plate openings 287 and into bellows chamber 298, as described in detail above and shown in FIG. 4. The restricted flow of air through flapper orifices 297 causes viscous damping to occur. As an additional result of the flow through flapper orifices 297, the pressure differential between bellows chamber 298 and piston chamber 299 is reduced. Air will continue to flow through flapper orifices 297 and through bumper mounting plate openings 285 until the pressures of piston chamber 299 and bellows chamber 298 have equalized. When little or no suspension movement has occurred over a period of several seconds the pressure of bellows chamber 298 and piston chamber 299 can be considered equal.

By adjusting the relative sizes of volume $V_1$ of piston chamber 299, volume $V_2$ of bellows chamber 298, flapper orifices 297, and/or bumper mounting plate openings 285, it is possible to tune the level of viscous damping that is achieved as well as the frequency at which the highest level of viscous damping occurs. For example, a relatively smaller bellows chamber volume $V_2$, will produce a higher level of damping, as the pressure change within bellows chamber 298 will be higher for a given event, i.e., a higher pressure differential means more flow through bumper mounting plate openings 285 and over or through flappers 288, thereby resulting in more viscous damping. By further example, a relatively larger piston chamber volume $V_1$, will also produce a higher level of damping, as the pressure differential between piston chamber 299 and bellows chamber 298 will generally take longer to equalize, i.e., more air will need to flow over or through flappers 288 and bumper mounting plate openings 285 resulting in more viscous damping between the piston chamber and the bellows chamber. By further example, changing the characteristics of flappers 288 and flapper orifices 297, such as size, shape, length, number and stiffness, will in turn affect the time it takes for the pressures in piston chamber 299 and bellows chamber 298 to equalize. Therefore, the cross-sectional size of flapper orifices 297 and bumper mounting plate opening 285 can be altered to both vary the directional level of viscous damping and the frequency at which the highest level of damping occurs (FIG. 6).

As described above, volume $V_1$ of piston chamber 299, volume $V_2$ of bellows chamber 298 along with the cross-sectional area of bumper mounting plate openings 285 and orifices 297, relative to one another, provide application-specific damping characteristics, at standard temperature and pressure, to air spring 224 during operation of the vehicle. More specifically, the structural size of piston chamber 299 and bellows chamber 298 can be modified in order to increase or decrease volumes $V_1$ and $V_2$ of the piston chamber and the bellows chamber, respectively, in order to tune the damping characteristics of air spring 224 for certain applications. More particularly, as volume $V_1$ of piston chamber 299 increases, the damping capabilities of air spring 224 are also generally increased. As volume $V_2$ of bellows chamber 298 decreases, the damping capabilities of air spring 224 are generally increased. Moreover, the relative size of orifices 297 and bumper mounting plate openings 285 also determines the frequency at which improved damping will occur, with increased opening sizes raising the frequency at which the improved damping occurs and with decreased opening sizes lowering the frequency at which improved damping occurs as shown in FIG. 6.

Of course, other types of axle/suspension systems utilized for different applications and having different air springs, geometries, and physical properties would be tuned differently in order to optimize the damping characteristics for the particular application, but the fundamental concepts described herein would apply. By adjusting the variables set forth hereinabove, it can be seen that it is possible to adjust or tune the level of damping that is achieved in a given axle/suspension system at various amplitudes and frequencies experienced by the air spring during vehicle operation.

The air spring with damping features for heavy-duty vehicles of the present invention overcomes the problems associated with prior art air springs by providing an air spring that has optimum damping capabilities for a given application, yet uses generally fewer parts than prior art air springs with damping capabilities. The air spring with damping features for heavy-duty vehicles provides a method for tuning the components of the air spring, based upon piston chamber volume, bellows chamber volume, and the size, shape, and/or number of openings formed between the bellows chamber and the piston chamber of the air spring, in order to optimize damping characteristics of the air spring. By providing an air spring with damping characteristics for heavy-duty vehicles, the shock absorber of the axle/suspension system can be eliminated or reduced in size, thereby reducing complexity, saving weight and cost and allowing the vehicle to carry more cargo.

It is contemplated that preferred embodiment air springs 124, 224 of the present invention could be utilized on tractor-trailers or heavy-duty vehicles having one or more than one axle without changing the overall concept or operation of the present invention. It is further contemplated that preferred embodiment air springs 124, 224 of the present invention could be utilized on vehicles having frames or subframes which are moveable or non-movable without changing the overall concept of the present invention. It is yet even further contemplated that preferred embodiment air springs 124, 224 of the present invention could be utilized on all types of air-ride leading and/or trailing arm beam-type axle/suspension system designs known to those skilled in the art without changing the overall concept or operation of the present invention. For example, the present invention finds application in beams or arms that are made of materials other than steel, such as aluminum, other metals, metal alloys, composites, and/or combinations thereof. It is also contemplated that preferred embodiment air springs 124, 224 of the present invention could be utilized on axle/suspension systems having either an overslung/top-mount configuration or an underslung/bottom-mount configuration, without changing the overall concept of the present invention. The present invention also finds application in beams or arms with different designs and/or configurations than that shown above, such as solid beams, shell-type beams, truss structures, intersecting plates, spring beams and parallel plates. The present invention also finds application in intermediary structures such as spring seats. It is also contemplated that preferred embodiment air springs 124, 224 of the present invention could be utilized in conjunction with other types of air-ride rigid beam-type axle/suspension systems such as those using U-bolts, U-bolt brackets/axle seats and the like, without changing the overall concept or operation of the present invention. It is also contemplated that preferred embodiment air springs 124, 224 of the present invention could be formed from various materials, including but not limited to composites, metal and the like, without changing the overall concept or operation of the present invention. It is yet even further contemplated that preferred embodiment air springs 124, 224 of the present invention could be utilized with fewer than two or more than two openings 185, 285, 287, such as three, four or even five or more openings without changing the overall concept for operation of the present invention. It is also contemplated that preferred embodiment air springs 124, 224 of the present invention could be utilized with any viscous fluid, such as air or hydraulic fluid, without changing the overall concept of the present invention. It is further contemplated that preferred embodiment air springs 124, 224 of the present invention could be utilized in combination with prior art shock absorbers and other similar devices and the like, without changing the overall concept of the present invention. It is yet even further contemplated that the volume of bellows chamber 198, 298 and/or the volume of piston chamber 199, 299, and/or the cross-sectional area of bumper plate openings 185, 285 and/or flapper orifices 297 of preferred embodiment air springs 124, 224 of the present invention, could be scaled upwardly or downwardly according to the axle GAWR of the axle/suspension system on which they are being utilized, without changing the overall concept or operation of the present invention. It is also contemplated that the volume of bellows chamber 198, 298 and/or the volume of piston chamber 199, 299, and/or the cross-sectional area of bumper plate openings 185, 285 and/or flapper orifices 297 of preferred embodiment air springs 124, 224 of the present invention, could be dynamically altered during vehicle operation. More specifically, the bellows chamber volume and/or the piston chamber volume, and/or the cross-sectional area of the bumper plate openings and/or the flapper orifices could be altered during operation of the vehicle based upon the weight of the load being carried by the vehicle, in order to optimize the damping characteristics according to a specific cargo or load size, without changing the overall concept or operation of the present invention. For example, the cross-sectional area of bumper plate openings 185 of first preferred embodiment air spring 124 could be dynamically altered by changing the size of the openings 185, i.e. making the openings smaller or larger, during operation of the vehicle in response to the load being carried by the vehicle.

The objectives of the present invention are achieved by the air spring for a heavy-duty vehicle with damping features.

Accordingly, the air spring for a heavy-duty vehicle with damping features of the present invention is simplified, provides an effective, safe, inexpensive and efficient structure and method which achieves all the enumerated objectives, provides for eliminating difficulties encountered with prior art air springs having damping features, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the air spring for a heavy-duty vehicle with damping features is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. An air spring comprising:
a bellows chamber operatively connected to a piston chamber, at least one opening disposed between said bellows chamber and said piston chamber for fluid communication between the bellows chamber and the piston chamber, whereby a ratio of a cross-sectional area of said at least one opening in inches squared to a volume of said piston chamber in inches cubed to a volume of said bellows chamber in inches cubed, is from about 1:600:1200 to about 1:14100:23500, wherein said at least one opening includes a cross-sectional area of from about 0.039 in$^2$ to about 0.13 in$^2$.

2. The air spring of claim 1, wherein said at least one opening includes a generally circular shape.

3. The air spring of claim 1, wherein said at least one opening includes a cross-sectional area of about 0.06 in$^2$.

4. The air spring of claim 1, wherein said piston chamber has a volume of from about 150 in$^3$ to about 550 in$^3$.

5. The air spring of claim 1, wherein said piston chamber has a volume of about 240 in$^3$.

6. The air spring of claim 1, wherein said bellows chamber has a volume of from about 305 in$^3$ to about 915 in$^3$.

7. The air spring of claim 1, wherein said bellows chamber has a volume of about 485 in$^3$.

8. The air spring of claim 1, wherein said piston chamber further comprises a piston top plate, said at least one opening being formed in said piston top plate.

9. The air spring of claim 1, further comprising a flapper operatively connected to said at least one opening.

10. The air spring of claim 9, wherein said flapper is formed with a flapper orifice.

11. The air spring of claim 10, wherein said flapper orifice includes a cross-sectional area of from about 0.039 in$^2$ to about 0.13 in$^2$.

12. The air spring of claim 10, wherein said flapper orifice includes a cross-sectional area of about 0.06 in$^2$.

13. The air spring of claim 1, wherein said air spring is mounted on a heavy-duty axle/suspension system.

14. The air spring of claim 9, wherein said flapper is formed from metal.

15. The air spring of claim 10, wherein said flapper orifice includes a generally circular shape.

* * * * *